(12) United States Patent
Dannheisig et al.

(10) Patent No.: US 9,555,461 B2
(45) Date of Patent: Jan. 31, 2017

(54) METHOD FOR CONNECTING TWO COMPONENTS

(71) Applicant: JOHNSON CONTROLS GMBH, Burscheid (DE)

(72) Inventors: Andreas Dannheisig, Sassenberg (DE); Michael Hamers, Marburg (DE); Ludger Mühlenbrock, Recklinghausen (DE); Volker Schmidt, Wetter (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 3 days.

(21) Appl. No.: 14/410,285

(22) PCT Filed: Jun. 20, 2013

(86) PCT No.: PCT/EP2013/062914
§ 371 (c)(1),
(2) Date: Dec. 22, 2014

(87) PCT Pub. No.: WO2013/190054
PCT Pub. Date: Dec. 27, 2013

(65) Prior Publication Data
US 2015/0321239 A1    Nov. 12, 2015

(30) Foreign Application Priority Data

Jun. 21, 2012  (DE) .................. 10 2012 012 200
Jul. 12, 2012  (DE) .................. 10 2012 013 750

(51) Int. Cl.
*B21D 39/00*    (2006.01)
*B23P 11/00*    (2006.01)
(Continued)

(52) U.S. Cl.
CPC .............. *B21D 39/00* (2013.01); *B21D 19/00* (2013.01); *B21D 39/06* (2013.01); *B23P 11/005* (2013.01);
(Continued)

(58) Field of Classification Search
CPC ................. Y10T 29/49865; Y10T 29/49915; Y10T 29/4992; Y10T 29/49934; Y10T 29/49936; B23P 11/025; B23P 11/005; B21D 39/026; B21D 39/06
See application file for complete search history.

(56) References Cited

U.S. PATENT DOCUMENTS 3,119,435 A * 1/1964 Greenman ........... B21D 39/063
182/228.6
4,118,855 A   10/1978 Lequeux
(Continued)

FOREIGN PATENT DOCUMENTS

DE       10 228 312 A1   1/2004
DE   10 2004 001 925 B3   3/2005
(Continued)

OTHER PUBLICATIONS

Korean Office Action dated May 27, 2016.
Japanese Office Action dated Jun. 16, 2016.
Chinese Office Action dated Sep. 30, 2016.

*Primary Examiner* — Jermie Cozart
(74) *Attorney, Agent, or Firm* — McGlew and Tuttle, P.C.

(57) ABSTRACT

A method for connecting two components. The method includes heating a deformation region of at least one component part to provide complete heating. The at least one component part is plastically deformed after the complete heating of the deformation region.

20 Claims, 2 Drawing Sheets

(51) Int. Cl.
  *B21D 19/00* (2006.01)
  *B21D 39/06* (2006.01)
  *B21D 39/02* (2006.01)
  *F27D 99/00* (2010.01)
(52) U.S. Cl.
  CPC ..... *B21D 39/026* (2013.01); *F27D 2099/0058* (2013.01); *Y10T 29/49865* (2015.01); *Y10T 29/49909* (2015.01); *Y10T 29/49915* (2015.01); *Y10T 29/49917* (2015.01); *Y10T 29/49936* (2015.01)

(56) References Cited

U.S. PATENT DOCUMENTS

| | | | | |
|---|---|---|---|---|
| 4,261,436 A | * | 4/1981 | Stillman, Jr. | E06C 7/085 |
| | | | | 182/194 |
| 4,766,664 A | | 8/1988 | Benedyk | |
| 5,458,393 A | | 10/1995 | Benedyk | |
| 5,769,499 A | * | 6/1998 | Dudash | B60N 2/4808 |
| | | | | 297/391 |
| 6,035,516 A | * | 3/2000 | Petersen | B21D 39/044 |
| | | | | 29/505 |
| 2002/0121015 A1 | * | 9/2002 | Petersen | B21D 39/044 |
| | | | | 29/450 |
| 2004/0245676 A1 | * | 12/2004 | Zaluzec | B21D 39/021 |
| | | | | 264/294 |
| 2008/0172875 A1 | * | 7/2008 | Sakai | F02M 37/048 |
| | | | | 29/888.02 |
| 2009/0229335 A1 | | 9/2009 | Carsley et al. | |

FOREIGN PATENT DOCUMENTS

| | | |
|---|---|---|
| DE | 10 2006 049 146 A1 | 4/2008 |
| EP | 2 543 451 A1 | 1/2013 |
| JP | S52-24150 A | 2/1977 |
| JP | H02 280930 A | 11/1990 |
| JP | H04-280915 A | 10/1992 |
| JP | H08-19881 A | 1/1996 |
| JP | H08-192235 A | 7/1996 |
| JP | 2005-224844 A | 8/2005 |
| JP | 2010-069927 A | 4/2010 |
| JP | 2010-514568 A | 5/2010 |
| KR | 10-0268954 B1 | 10/2000 |
| WO | 95/04616 A1 | 2/1995 |

\* cited by examiner

METHOD FOR CONNECTING TWO COMPONENTS

CROSS REFERENCE TO RELATED APPLICATIONS

This application is a United States National Phase Application of International Application PCT/EP2013/062914 filed Jun. 20, 2013 and claims the benefit of priority under 35 U.S.C. §119 of German Patent Applications DE 10 2012 012 200.4 filed Jun. 21, 2012 and DE 10 2012 013 750.8 filed Jul. 12, 2012, the entire contents of which are incorporated herein by reference.

FIELD OF THE INVENTION

The present invention relates to a method for joining two components.

BACKGROUND OF THE INVENTION

In automotive engineering, components are, nowadays, increasingly often bonded with each other by plastic deformation, for example by crimping. At the same time, there is a requirement for these component parts to be designed lighter in weight, i.e. for example thinner-walled or with a small cross-section. Thus, the component parts, particularly during bonding of component parts by plastic deformation, may suffer damage, which may for example impair the safety of the resulting bond.

SUMMARY OF THE INVENTION

Consequently, the present invention aims to provide a method for joining two component parts, free of the disadvantages of prior art technology.

This problem is solved by a method for joining two component parts by plastic deformation, in which at least one component part is heated into its deformation range prior to its plastic deformation, particularly completely heated.

The present invention relates to a method joining two component parts by use of plastic deformation. Such processes are known to prior art as, e.g. crimping, flaring, acute-angle bulging or flanging. For that matter, a component part is stuck into another component part, after which one of the component parts is plastically deformed in such a way, that the bond is irreversible. According to the invention, deformation takes place on a previously heated component part, wherein heating preferably occurs in the entire area that is to be deformed. For example, the component part is heated over its entire inner and/or outer circumference, but only locally in the area, in which the bond and/or the deformation is to be realized, i.e. not across the component part's entire length. This type of heating is particularly preferable for crimping or flanging. Heating may however also only occur in a partial area of the circumference. The subsequent plastic deformation may still occur in the deformation range's heated condition. Due to the heating, the component part is softer locally and thus allows for deformation, without, for example, any cracks developing. The deformation may however also occur in the, at least partially, cooled-down condition of the component part. In doing so, the heating, and particularly the cooling causes a structural change in the material, so that the component part's structure is permanently weakened in the deformation range and is thus easier to deform, while no cracks are formed during deformation. Particularly, in the event of a complete heating, the component part's entire circumference may deform during plastic deformation and no overstraining of the material takes place. The heating is preferably ring-shaped, particularly toroidal or in the form of a segment of a circle.

Alternatively, the structure of the component part's material may also be hardened by the heating and/or cooling.

The heating also allows for local stresses to be increased or decreased.

The method according to the invention may be used, for example, to create a bearing location for a spring, particularly a torsion spring in a pipe, and/or to bond the spring with the pipe.

The method according to the invention preferably involves joining metallic component parts to one another. Preferably, radiation is used as a source of heat, particularly a laser. Preferably, the radiation from a radiation source is diverted via an optical means in such a way, that it strikes the component part's entire circumference simultaneously, particularly the area which is to be deformed. For that matter, the component part is preferably stationary, i.e. it is not moved during heating, for example rotated. Thus, time is saved and/or heating occurs more evenly. Preferably, the means is a mirror, particularly a ring mirror and/or a cone-shaped mirror and/or a lens. Furthermore, particularly a translucent mirror is employed. The optical means may also be used to achieve, that no radiation is released to the environment. Consequently, containment of the heating zone may be omitted.

Additionally or alternatively, the component part is rotated during heating. In the case of radiation being used as a source of heat, heating is preferably contained.

The component part's heating may occur "inline", particularly during deformation of component parts which have already cooled off, heating may also take place "offline".

According to a further preferred embodiment, heating takes place by induction.

Preferably, the component part's heating is monitored by a sensor, for example a camera, in particular an infrared camera, and/or a pyrometer and the source of heat, particularly the source of radiation and/or the optical means, is regulated via the sensor's signal.

Preferably, the heated component part, after its bonding with the other component part, is cooled in such a way, that subsequently it features desired material properties. For example, cooling results in a structural change.

Furthermore, particularly the component part to be heated preferably features various material properties. For example, a material with extraordinary hardness is employed in the bonding area, while the rest of the component part is produced from a material with a lesser hardness.

After its heating, the heated component part is deformed, preferably right away, in order to enter a bond with the other component part.

The present invention shall be explained in more detail on the basis of the following figures and exemplary embodiments, without the present invention being limited to these. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
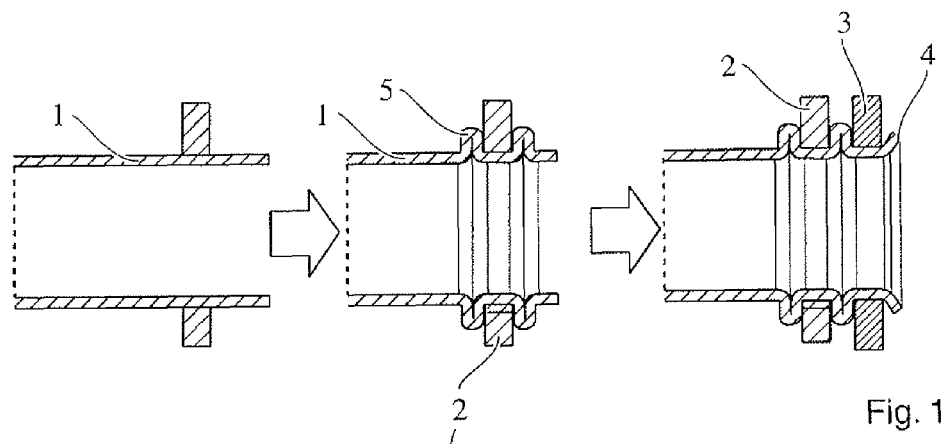
FIG. 1 is a view showing a bond with crimping and flanging.

FIG. 1 shows the bond between a first component part 1, in this case a pipe, with two secondary component parts 2, 3. Pipe 1 is pushed into the two component parts 2, 3, as illustrated by the blue arrow, and plastically deformed thereafter, so that the pipe is tightly bonded with the component parts 2, 3. The bond between pipe 1 and the component part 2 takes place by crimping 5, while component part 3 is attached to the pipe's 1 end by flanging 4. During crimping or flanging, the pipe 1 is plastically deformed in such a manner, that the component parts 2, 3 are bonded with the pipe by form-fit and/or force-fit. While component part 2 is connected to pipe 1 in a manner, in which torque is transferred, pipe 1 may rotate within side part 3.

Figure 2:
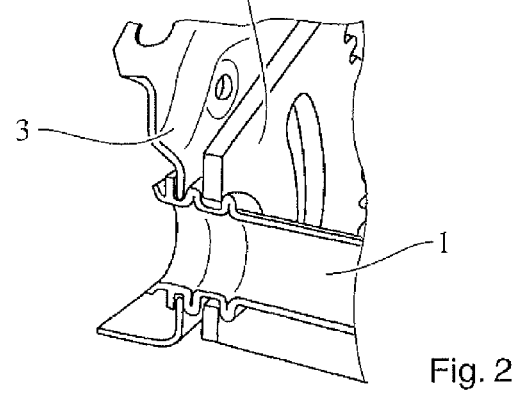
FIG. 2 is a view showing a bond between a cross beam and a side part of a motor vehicle seat.

FIG. 2 shows an application of the bond according to FIG. 1. It is recognizable, that pipe 1 is the cross beam of the frame of a seat part of a motor vehicle seat, which is for one bonded with a side part 3 of this frame, and also with a part 2 of the height adjustment of the motor vehicle seat.

Figure 3:
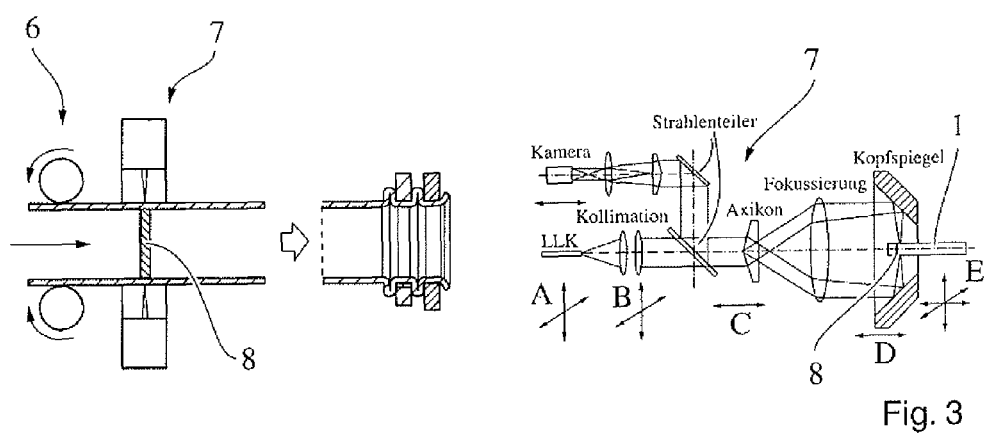
FIG. 3 is a view showing the component part's heating.

In FIG. 3, the heating—according to the invention—of the pipe, for producing the bond with another component part is shown. For heating, pipe 1 is transported through a heating 7 via a drive 6, in this case two rollers, in which the pipe is simultaneously and entirely heated in one, in this case in several place(s), which are preferably provided at a distance from one another. The pipe is heated simultaneously and evenly along its entire circumference. Preferably the pipe does not move during its heating. In the present case, heating occurs in the area of circular ring 8. For this matter, the circular ring 8 on the pipe's outer circumference is simultaneously and/or evenly heated. Immediately afterwards, deformation of the pipe for producing the crimping or flanging bond takes place. In the present case, the heating of circular ring 8 at the outer circumference of pipe 1 occurs via a laser beam, which is converted via multiple optical means, particularly a cone-shaped mirror, into a ring-shaped radiation, into which the component part to be heated, in this case pipe 1, is placed, in order to locally and simultaneously heat it in its entire volume. In relation to the cone-shaped mirror, the component part to be heated may be shifted, so that areas may be heated, which are axially spaced. However, in the course of the actual heating of the heating area 8, the pipe 1 preferably stands still. Furthermore, the apparatus features a camera, by which the pipe's temperature is measured at the heated circumference. This camera's signal is used for regulation of the laser.

Figure 4:
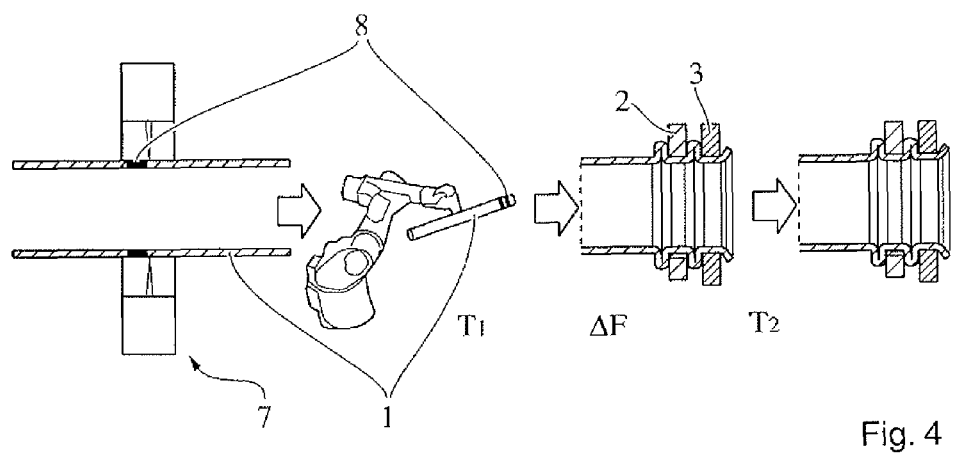
FIG. 4 is a view showing an embodiment of the method according to the invention.

In FIG. 4 a first embodiment of the process according to the invention is shown. The component part 1 is locally heated to a temperature via a heating means 7, for example a ring laser, in this case toroidal, which is denoted by reference numeral 8. Afterwards, the component part 1 is removed from the heating 7, in this case by a robot, and joined to component parts 2, 3 by crimping and flanging. In comparison to a non-heated deformation range, the heating of the deformation range reduces the energy F required for the deformation. Not until then is the component part cooled down to a temperature T2. Cooling can take place in such a way, that it results in a structural change in the heated and/or deformed area.

Figure 5:
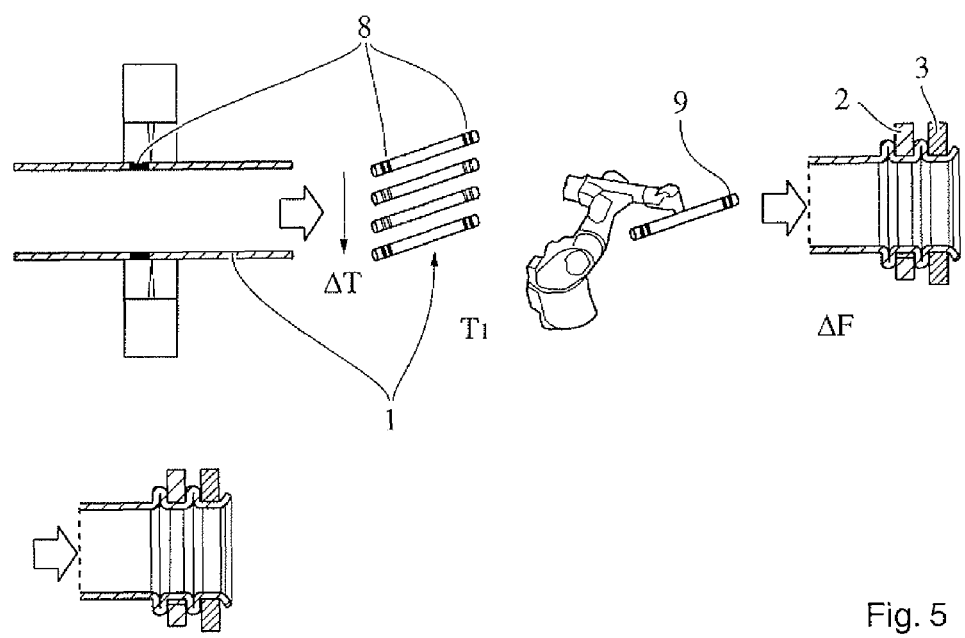
FIG. 5 is a view showing another embodiment of the method according to the invention.

In FIG. 5 an alternative version of the process is shown. After heating, the heated areas are cooled off in a controlled manner in such a way, that the component part's structure is intentionally weakened locally, in particular by a structural change. Not until after the component part has been cooled down, does the deformation take place, in this case by crimping and flanging, which has already been described above. As a result of the component part's structure having been intentionally weakened in the bonding area, the deformation may occur more easily and/or free of crack formation. The heating/cooling may occur inline or offline.

While specific embodiments of the invention have been shown and described in detail to illustrate the application of the principles of the invention, it will be understood that the invention may be embodied otherwise without departing from such principles.

The invention claimed is:

1. A method for joining two components by plastic deformation, the method comprising the steps of:
simultaneously heating a plurality of different axially spaced deformation ranges of at least one component by radiation including a laser for heating an entire circumference of the at least one component, the deformation ranges comprising two deformation areas; and
plastically deforming the at least one component part after simultaneously heating the plurality of axially spaced deformation ranges such that the deformation areas protrude radially outward from the least one component, wherein another component is sandwiched between the two deformation areas.

2. A method according to claim 1, wherein the plastic deformation occurs in a heated state.

3. A method according to claim 1, wherein the deformation area is cooled down prior to the plastic deformation.

4. A method according to claim 1, wherein the structure of the at least one component is locally weakened by the heating.

5. A method according to claim 1, wherein the two component parts are bonded to one another by crimping, the deformation areas being in direct contact with the another component.

6. A method according to claim 1, wherein the two components are metallic component parts that are joined to one another.

7. A method according to claim 1, wherein radiation is a ring-shaped radiation diverted via an optical means.

8. A method according to claim 1, wherein the heated component part, after bonding with another component part, is cooled in such a way, that subsequently the heated component part has the desired material properties.

9. A method for joining two components by plastic deformation, the method comprising the steps of:
simultaneously heating a plurality of axial extents of at least one component by radiation to provide a plurality of heated of axial extents, each of said axial extents being located at a spaced location from each other, wherein a non-radiated area of the at least one component extends between each of said axial extents and another one of said axial extents; and
subsequent to initiating said radiation, plastically deforming the at least one component part such that each of said heated axial extents extends radially outward from the least one component to form plastically deformed areas of said at least one component, wherein another component is fixed via said plastically deformed areas of said at least one component, said another component being located opposite at least a portion of said non-radiated area.

10. A method according to claim 9, wherein the plastic deformation occurs in a heated state.

11. A method according to claim 9, wherein the deformation area is cooled down prior to the plastic deformation.

12. A method according to claim 9, wherein the structure of the at least one component is locally weakened by the heating.

13. A method according to claim 9, wherein the two component parts are bonded to one another by crimping, said another component being in direct contact with said plastically deformed areas.

14. A method according to claim 9, wherein the two components are metallic component parts that are joined to one another.

15. A method according to claim 9, wherein the radiation is a ring-shaped radiation diverted via an optical means.

16. A method according to claim 9, wherein the heated component, after fixing to the another component, is cooled in such a way, that subsequently the heated component part has desired material properties.

17. A method for joining two components by plastic deformation, the method comprising the steps of:
   providing at least a first component, said first component comprising a first area and a second area, said first area being located at a spaced location from said second area;
   providing at least a second component;
   simultaneously heating said first area and said second area by radiation to provide a plurality of heated areas, said first component comprising a non-radiated area extending between said first area and said second area; and
   subsequent to initiating said radiation, arranging said second component adjacent to said first component and plastically deforming the first component such that each of said first area and said second area extends radially outward from the first component to form at least a first plastically deformed area and a second plastically deformed area of said first component, wherein said second component is fixed to said first component via said first plastically deformed area and said second plastically deformed area, said second component being located opposite at least a portion of said non-radiated area.

18. A method according to claim 17, wherein the plastic deformation occurs in a heated state.

19. A method according to claim 17, wherein the first area and the second area are cooled down prior to the plastic deformation.

20. A method according to claim 17, wherein the radiation is a ring-shaped radiation diverted via an optical means, said second component being in direct contact with said first plastically deformed area and said second plastically deformed area.

* * * * *